United States Patent
Deragarden et al.

(10) Patent No.: US 10,501,087 B2
(45) Date of Patent: Dec. 10, 2019

(54) METHOD AND ARRANGEMENT FOR DETERMINING THE SPEED BEHAVIOUR OF A LEADING VEHICLE

(71) Applicant: VOLVO TRUCK CORPORATION, Göteborg (SE)

(72) Inventors: Hans Deragarden, Kullavik (SE); Fredrik Sandblom, Mölndal (SE)

(73) Assignee: VOLVO TRUCK CORPORATION, Göteborg (SE)

( * ) Notice: Subject to any disclaimer, the term of this patent is extended or adjusted under 35 U.S.C. 154(b) by 529 days.

(21) Appl. No.: 14/650,564

(22) PCT Filed: Dec. 19, 2012

(86) PCT No.: PCT/SE2012/000208
§ 371 (c)(1),
(2) Date: Jun. 8, 2015

(87) PCT Pub. No.: WO2014/098653
PCT Pub. Date: Jun. 26, 2014

(65) Prior Publication Data
US 2015/0314790 A1 Nov. 5, 2015

(51) Int. Cl.
*G06F 17/50* (2006.01)
*B60W 40/04* (2006.01)
(Continued)

(52) U.S. Cl.
CPC .............. *B60W 40/04* (2013.01); *B60Q 9/008* (2013.01); *B60W 30/095* (2013.01);
(Continued)

(58) Field of Classification Search
CPC ............... B60W 40/04; B60W 30/095; B60W 50/0097; B60W 30/16; B60W 2420/52;
(Continued)

(56) References Cited

U.S. PATENT DOCUMENTS

2005/0143221 A1   6/2005   Kuwahara et al.
2006/0111831 A1   5/2006   Sekiguchi
(Continued)

FOREIGN PATENT DOCUMENTS

DE   102007029482 A1 *   1/2009
DE   102007029482 A1     1/2009
(Continued)

OTHER PUBLICATIONS

Fossati et al. "Real-Time Vehicle Tracking for Driving Assistance", 2010, 9 pages.*
(Continued)

*Primary Examiner* — Dwin M Craig
(74) *Attorney, Agent, or Firm* — Venable LLP; Jeffri A. Kaminski

(57) ABSTRACT

An arrangement for determining a vehicle speed behaviour model for a leading vehicle, where the leading vehicle drives along a path in front of a trailing host vehicle and where the determination is done by a control unit in the host vehicle, where the host vehicle includes an arrangement for measuring the time gap to the leading vehicle, an arrangement for measuring the speed of the host vehicle, an arrangement for obtaining external information regarding an upcoming change in a road condition, where the control unit is adapted for monitoring the change in vehicle speed of the leading vehicle, and for determining a vehicle speed behaviour model for the leading vehicle based on the monitored change in vehicle speed of the leading vehicle. The vehicle speed behaviour of a leading vehicle can be used by the host vehicle to optimize the fuel consumption, the comfort and the safety of the host vehicle.

18 Claims, 2 Drawing Sheets

(51) Int. Cl.
*B60Q 9/00* (2006.01)
*G01P 3/00* (2006.01)
*B60W 30/16* (2012.01)
*B60W 50/00* (2006.01)
*B60W 30/095* (2012.01)
*F16H 61/00* (2006.01)
*B60W 50/14* (2012.01)

(52) U.S. Cl.
CPC ........ *B60W 30/16* (2013.01); *B60W 50/0097* (2013.01); *G01P 3/00* (2013.01); *B60W 2050/143* (2013.01); *B60W 2420/52* (2013.01); *B60W 2550/146* (2013.01); *B60W 2550/302* (2013.01); *B60W 2550/402* (2013.01); *F16H 2061/0093* (2013.01)

(58) Field of Classification Search
CPC ..... B60W 2050/143; B60W 2550/146; B60W 2550/402; B60W 2550/302; B60Q 9/008; G01P 3/00; F16H 2061/0093
USPC .......................................................... 701/80
See application file for complete search history.

(56) References Cited

U.S. PATENT DOCUMENTS

| | | | |
|---|---|---|---|
| 2007/0208498 A1* | 9/2007 | Barker | G08G 1/0104 701/117 |
| 2008/0022969 A1 | 1/2008 | Frenz et al. | |
| 2011/0276246 A1 | 11/2011 | Kuze | |
| 2012/0083987 A1 | 4/2012 | Schwindt | |
| 2012/0161980 A1* | 6/2012 | Bonne | B60W 30/09 340/905 |

FOREIGN PATENT DOCUMENTS

| | | | | |
|---|---|---|---|---|
| DE | 102008019174 A1 | | 10/2009 | |
| DE | 102011002275 A1 | * | 10/2012 | |
| DE | 102011002275 A1 | | 10/2012 | |
| EP | 1356978 A2 | | 10/2003 | |
| EP | 2527222 A2 | | 11/2012 | |
| EP | 2540589 A2 | | 1/2013 | |
| GB | 2452579 A | | 3/2009 | |
| WO | 2011075063 A1 | | 6/2011 | |
| WO | WO 2011075063 A1 | * | 6/2011 | ............ B60W 10/06 |
| WO | 2012020297 A1 | | 2/2012 | |
| WO | 2012105889 A1 | | 8/2012 | |
| WO | WO 2012161980 A1 | * | 11/2012 | ............ G06F 21/602 |

OTHER PUBLICATIONS

European Official Action (dated May 10, 2017) for corresponding European App. EP 12 890 577.5.
International Search Report (dated Oct. 18, 2013) for corresponding International App. PCT/SE2012/000208.
International Preliminary Report on Patentability (dated Nov. 3, 2015) for corresponding International App. PCT/SE2012/000208.

* cited by examiner

METHOD AND ARRANGEMENT FOR DETERMINING THE SPEED BEHAVIOUR OF A LEADING VEHICLE

BACKGROUND AND SUMMARY

The present invention relates to an arrangement and a method for determining a vehicle speed behaviour model for a leading vehicle. The invention further relates to a computer program adapted to perform such a method when said program is run on a computer, and a computer program product comprising such program code means stored on a computer readable medium. The arrangement is especially suitable for vehicles having an adaptive cruise control system.

Modern vehicles are often provided with a cruise control system in order to improve the comfort of a driver. Some cruise control systems are provided with further functions, such as an adaptive control system that uses distance measuring equipment to monitor the distance to a vehicle in front of the own vehicle, in order to be able to adapt the cruise speed to the speed of the vehicle in front. Such a system will improve the safety of the cruise control system since a minimum distance to the vehicle in front will be maintained. Some systems will also brake the vehicle if the minimum distance is not maintained, or if the distance to the vehicle in front decreases at a certain rate. The cruise control system may be adapted to maintain a set speed by using only the accelerator, or by also using the brakes of the vehicle. This is especially common in heavy vehicles which are equipped with auxiliary brakes, such as engine brakes and retarders.

For a vehicle travelling behind another vehicle or a group of vehicles, a good time gap (or distance) control is essential in order to travel comfortably, safe and efficient and at the same time balancing the desire to reach the set speed of the cruise control with the need to keep a safe time gap to the vehicle in front. When travelling with an adaptive cruise control engaged, which uses a forward looking sensor, the set speed of the host vehicle is changed when the distance to the vehicle in front changes. With more advanced cruise control systems, often referred to as a dynamic cruise control system (e.g. using map data and sensors), the set speed of the host vehicle may be changed for example in curves, when new speed limits are found, over a crest and in the end of a downhill in order to save fuel and increase safety. To be able to use such fuel saving features of the cruise control, the time gap control must take the distance to the leading vehicle into account. When the distance to the leading vehicle changes, e.g. due to a changed speed of the leading vehicle, the time gap control might not be able to keep a safe distance to the leading vehicle, or the cruise control may not be able to hold the set vehicle speed.

If an automatic speed control like a dynamic cruise control performs badly due to above mentioned reasons, fuel efficiency, safety or comfort will be suffering and the driver may turn the system off.

The cruise control system has a regulating range in which the actual speed value is maintained. For a system using only the accelerator to maintain the speed, an excessive speed of a few percent may be allowed. Typically, the speed may vary between e.g. 68 to 72 km/h when the speed is set to 70 km/h. It may be possible to set the maximal allowed excessive speed value for the vehicle. In this way, the system can allow the vehicle to travel at an excessive speed at certain occasions, e.g. when travelling on a slight descent.

When the brake system is also used to maintain the speed of the vehicle, referred to as a brake cruise system, a specified excessive speed can also be allowed for a vehicle rolling down a fairly steep downhill slope. An allowed excessive speed may help to preserve energy by using the momentum of the vehicle. The limit for the allowed excessive speed must of course be set to a value that does not endanger other vehicles.

For a vehicle having an adaptive cruise control, a distance measuring device such as a radar measures the distance to a vehicle ahead, and regulates the set speed of the cruise control such that a predefined distance or time gap is preserved between the own vehicle and the vehicle ahead. When the vehicle ahead changes its speed, the adaptive cruise control will preserve the predefined distance or time gap within the selected cruise control range. If the vehicle ahead brakes rapidly, a warning message and/or an automatic brake function will be activated in the own vehicle. Such a system works fine for keeping a predefined distance to a vehicle ahead and for avoiding an accident.

There are however situations in which an adaptive cruise control does not control the speed of the vehicle in a fuel efficient way. Such a situation may e.g. be when the vehicle ahead is not controlled in the same way as the own vehicle. If the vehicle ahead e.g. reaches an ascent and loses speed rapidly, the adaptive cruise control of the on vehicle will apply the brakes such that the distance to the vehicle in front is retained. In this way, the own vehicle will lose momentum which affects the fuel, efficiency negatively. Since the cruise control system cannot take account for this rapid speed loss, it cannot adapt the speed control for such a situation. Another situation may be when the cruise control of the vehicle ahead is using a greater speed regulating range than the own vehicle. Also in this situation, the cruise control will not be able to adapt to the speed of the vehicle ahead in a fuel efficient way.

There is thus a need for a system that can adapt to a vehicle ahead in a fuel efficient way.

It is desirable to provide an arrangement for determining a vehicle speed behaviour model for a leading vehicle. It is also desirable to provide a method for determining a vehicle speed behaviour model for a leading vehicle.

In an arrangement for determining a vehicle speed behaviour model for a leading vehicle according, to an aspect of the invention, where the leading vehicle drives along a path in front of a trailing host vehicle and where the determination is done by a control unit in the host vehicle, where the host vehicle comprises means for measuring the time gap to the leading vehicle, means for measuring the speed of the host vehicle, means for obtaining external information regarding an upcoming change in a road condition, the problem is solved in that the control unit is adapted for monitoring the change in vehicle speed of the leading vehicle, and for determining a vehicle speed behaviour model for the leading vehicle based on the monitored change in vehicle speed of the leading vehicle.

By this first embodiment of the arrangement, the control unit tracks the time gap to the leading vehicle, preferably by measuring the time gap with a predefined sample rate. The control unit further tracks the speed of the host vehicle, preferably with a predefined sample rate. The control unit will receive external information regarding an upcoming change in a road condition, e.g. from a map database or from a road sign having, a radio transmitter. The control unit will monitor the change in vehicle speed of the leading vehicle in dependency of the change in road condition, and will from this speed change determine a vehicle speed behaviour model for the leading vehicle. The vehicle speed behaviour model may be adapted to the type of road change condition.

The vehicle speed behaviour of the leading vehicle may be different for an ascent than for a change in allowed road speed. The vehicle speed behaviour may further be dependent on the driver of the leading vehicle, or may be dependent on the type of cruise control that the leading vehicle is provided with. The speed behaviour will e.g. differ between a conventional cruise control and an adaptive cruise control.

The vehicle speed behaviour model can be used by the host vehicle to predict the behaviour of the leading vehicle. Such a behaviour may e.g. be how the leading vehicle reacts on a change in road condition. When a change in the allowed road speed occurs, the leading vehicle may either roll until the new, lower allowed speed is obtained, or it may brake in order to reach the lower speed faster. By knowing this behaviour in advance, the cruise control of the host vehicle can adapt to the behaviour e.g. by temporarily leaving a longer distance to the leading vehicle at a change in road condition, such that an unnecessary braking of the vehicle is avoided.

The vehicle speed behaviour model can also be used when the host vehicle is driven without cruise control, e.g. by adapting a forward warning system used to give a warning when the leading vehicle is within a predefined distance. If it is known that the leading vehicle brakes hard in order to reduce the speed, the predefined distance for the warning can temporarily be increased somewhat. The vehicle speed behaviour model can e.g. also be used by an anticipative driveline which optimises gear changes automatically, in eco-roll systems and in hybrid systems in order to blend power sources.

In an advantageous development of the inventive arrangement, the arrangement comprises a forward looking sensor that can monitor also a vehicle ahead of the leading vehicle. In this way, the vehicle speed behaviour model will also take account of how the leading vehicle behaves with regard to the vehicle ahead of the leading vehicle. The comfort of the driver in the host vehicle may thus be further improved, together with an improvement of the fuel efficiency.

In a method for determining a vehicle speed behaviour model for a leading vehicle, where the leading vehicle drives along a path in front of a trailing host vehicle and where the determination is done in the host vehicle, the steps of tracking the time gap to the leading vehicle, tracking the speed of the host vehicle, obtaining external information regarding an upcoming change in a road condition, which may alter the speed of the host vehicle, monitoring the change in vehicle speed of the leading vehicle, and determining a vehicle speed behaviour model for the leading vehicle based on the monitored changes in vehicle speed of the leading vehicle are comprised.

With the inventive method, an improved behaviour of the cruise control system of a vehicle can be obtained, in which the cruise control system will adapt to the speed behaviour of the vehicle ahead. In this way, the fuel consumption can be lowered compared with an adaptive cruise control regulating on the distance or the time gap to the vehicle ahead.

BRIEF DESCRIPTION OF DRAWINGS

The invention will be described in greater detail in the following, with reference to the attached drawings, in which.

DETAILED DESCRIPTION

The embodiments of the invention with further developments described in the following are to be regarded only as examples and are in no way to limit the scope of the protection provided by the patent claims. The arrangement is suitable for all kinds of vehicles, but is especially suitable for heavy vehicles such as trucks and busses, since the road conditions will affect the fuel consumption for such vehicles to a larger extent. In the examples, a truck is used as a leading vehicle, but the arrangement is suitable for all types of leading vehicles, such as busses and passenger cars.

Figure 1:
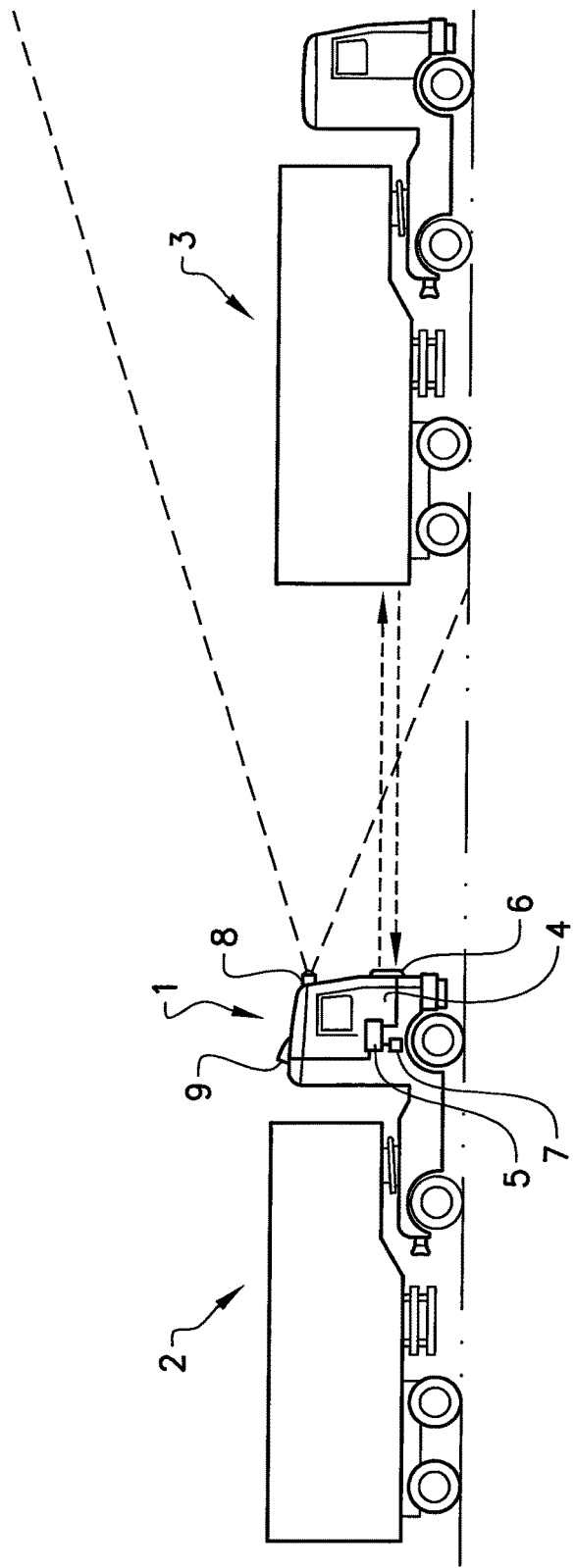
FIG. 1 shows a schematic view of an arrangement for determining, a vehicle speed behaviour model for a leading vehicle according to the invention.

FIG. 1 shows schematically a host vehicle 2 and a leading vehicle 3. The host vehicle comprises an arrangement. 1 for determining a vehicle speed behaviour model for a leading vehicle travelling along a path 10. The arrangement 1 is preferably mounted in the cab 4 of the vehicle, but may also be partly or completely mounted in other locations of the vehicle, e.g. in the engine compartment. The arrangement 1 comprises a control unit 5 adapted to receive input signals and to determine a vehicle speed behaviour model for a leading vehicle. The control unit receives time gap signals from a distance measuring means 6, which may be a radar or another type of distance measuring means, such as a camera 8. The control unit further receives a host vehicle speed signal from a vehicle speed measuring means 7, which is preferably integrated in a hub unit of the vehicle. The vehicle speed signal is preferably supplied from another vehicle control unit over a bus system. The control unit is also connected to a communication means 9, which comprises a GPS receiver and means for receiving map database information. The arrangement further comprises a user interface means 11 adapted to give a message to the driver. This may e.g. be a display or a red warning light.

The control unit 5 may be either a standalone control unit connected to the cruise control system or may be integrated e.g. as a software module in the cruise control system or in another electronic control unit (ECU) in the vehicle. In the described example, the control unit will be described as a control unit which communicates with other units via discrete lines, even though the units will actually communicate over a vehicle data bus.

The distance measuring means 6 is preferably a radar as used in a time gap control system, which measures the distance or time gap to a vehicle ahead, and which gives a warning when the distance or time gap is below a predetermined value. The predetermined value can be set within specified limits in order to adapt the system to the drivers preferences and to the traffic situation. The system may also be set such that distance is used as control parameter when the vehicle is travelling below a specified speed, such as e.g. 40 km/h, and that a time gap is used for higher vehicle speeds. The distance control means may use a blend of distance and time gap based on specific algorithms. The distance measuring means may also be optical such as a lidar or may use a camera.

The vehicle speed measuring means 7 used to give information about the host vehicle speed is preferably the regular speed measuring means of the vehicle, but the speed may also be obtained in other ways, e.g. from a GPS system. The means for obtaining external information regarding road condition is preferably integrated in the communication system of the vehicle. In this way, map data and traffic data can be received by the vehicle and used by the arrangement. External information regarding upcoming changes in road conditions may also be obtained e.g. from a system using a camera 8 which may e.g. detect road signs or the traffic situation ahead.

When the host vehicle drives on a path, such as a highway or other road where a relatively high speed is allowed and where a relatively constant speed can be maintained, the control unit receives information from the distance measuring means 6 regarding the distance or time gap to the leading vehicle 3. Since the control unit also has the speed information of the host vehicle, the speed of the leading vehicle can be obtained.

The speed of the leading vehicle is tracked by measuring the speed constantly or at predefined intervals, such as several times every second. At the same time, the control unit is monitoring external information regarding the road condition. When the control unit receives external information regarding a change in a road condition that may affect the speed of the leading vehicle, the tracking of the speed of the leading vehicle may be intensified, such that the speed of the leading, vehicle is measured more often. The change in speed of the leading vehicle is compared with the change in road condition, and the result is used by the control unit for determining a vehicle speed behaviour model for the leading vehicle. The result of a single speed change may be saved in a memory in order to be able to determine a more complex vehicle speed behaviour model, since the vehicle speed behaviour model may differ depending on the type of road condition change.

In a first example, the change in road condition could e.g. be a change in road speed limit from 90 km/h to 70 km/h. If the speed change of the leading vehicle is relatively slow, it can be assumed that the driver of the leading vehicle, or the cruise control of the leading vehicle, just releases the accelerator pedal and lets the vehicle roll until the new speed is reached. By the next change in road condition, this information can be used to adapt the speed control of the cruise control of the host vehicle.

In another example, the change in road condition is an ascent. The control unit will track the speed of the leading vehicle, and when the ascent starts, also track the change in speed of the leading vehicle. Depending on the inclination of the ascent, the leading vehicle may lose more or less speed. From this, a vehicle speed behaviour model can be determined, which takes account of how heavy the leading vehicle is in relation to how powerful the engine of the leading vehicle is. It is e.g. possible that the leading vehicle is a fully laden truck, which loses the speed relatively fast when the inclination starts and must shift down a gear or more. At the next ascent, the cruise control of the host vehicle can adapt to this behaviour and increase the distance to the leading vehicle in advance, such that the cruise control can work in a fuel efficient way.

The control unit continues to track the speed behaviour of the leading vehicle every time a change in the road condition occurs. In this way, the vehicle speed behaviour model can be adapted to the different types of road condition changes that occur. These may be e.g. road speed limits, map data such as hills, tunnels, curves etc, weather information or traffic information. The steepness of an ascent or descent is one parameter that will affect the speed of a leading vehicle, where the vehicle speed behaviour model is preferable adapted to the inclination angle.

With a vehicle speed behaviour model of the leading vehicle, a time gap control that is based on correctly made assumptions for how the leading vehicle will change speed is obtained. This is a substantial advantage compared to a time gap control that only uses filtered or delayed information of how the lead vehicle momentarily is changing its speed. Another advantage is when an adaptive cruise control is used, which uses map data and different sensors to monitor the surrounding. With such a system, the set speed for the host vehicle changes for example in curves, when new road speed limits are found, over a crest and in the end of a downhill in order to save fuel and increase safety. To be able to use such fuel saving features, the time gap control must take into account that the distance to the leading vehicle will change, and in which way the distance changes. A further condition to take account of is that the leading vehicle may also use a fuel saving speed control system.

If an automatic speed control like an adaptive cruise control repeatedly does not successfully handle distance control due to above mentioned reasons, fuel efficiency, safety and comfort will be suffering and the driver will most likely turn the system off. If the cruise control system of the leading vehicle is turned on or off, such a transition will affect the efficiency of the cruise control system of the following vehicle, since a control strategy for following a vehicle is dependent on the actual behaviour of that leading vehicle. Therefore, a further aspect is to detect the cruise control state transition from on to off, and vice versa, of a leading vehicle to further improve the host vehicle cruise control strategy. Furthermore, such a transition change can be the result of a critical event, such as an emergency breaking situation, involving the leading vehicle.

In one example, an instantaneous deviation by the leading vehicle from the estimated model, e.g. hard braking, can be detected and interpreted as a reason to adapt the behaviour of collision warning functions in the host vehicle. A transition in the leading vehicle from cruise control on to of indicates that either the driver in that vehicle intervened for some reason, or that an autonomous system did so, which indicates the need for an immediate action also in the host vehicle. This behaviour will increase traffic safety. Therefore, road safety can be improved by detecting that the leading vehicle turns the system off, which in itself is a source of information that the environment near the host vehicle will change very soon. Additionally, learning whether the leading vehicle has a regular cruise control system, an adaptive cruise control system or a dynamic cruise control system is also useful for determining a vehicle speed behaviour model for a leading vehicle.

The vehicle speed behaviour model of the leading vehicle can be used by the time gap control system of the host vehicle to control the speed of the host vehicle and the distance to the leading vehicle so that safety, fuel efficiency and comfort is best supported. The time gap control system may control the cruise control system such that the set target speed is adapted to the vehicle speed behaviour model of the leading vehicle. In this way, it is possible to harmonise the set target speed and other internal cruise control settings of the host vehicle by using the vehicle speed behaviour model of the leading vehicle.

The time gap control system may also use the vehicle speed behaviour model to adapt the limit when a warning is given to the driver. When the cruise control system is not used. If the vehicle speed behaviour model of the leading vehicle e.g. indicates that the leading vehicle will brake rapidly when the speed limit changes, the time gap control system may increase the time gap value temporarily such that a warning is given earlier, i.e. when the distance to the leading vehicle is longer than normal. In one example, the time gap is temporarily increased from 3.2 seconds to 4.5 seconds. A message in the form of a warning may be given in different ways. One way is to use a display or a red lamp that lights up or flashes when the leading vehicle is within the predefined distance.

When a host vehicle has travelled behind a leading vehicle for a long period, the arrangement has been able to determine a vehicle speed behaviour model comprising different behaviours for different conditions. It is also possible to define this as several vehicle speed behaviour models, with one vehicle speed behaviour model for each condition.

The arrangement will also be able to detect a transition between different models in order to use the proper model for the upcoming condition. The transition from one model to another can also be used for other purposes, such as a safety function. In one example, detecting that the leading vehicle is turning off the cruise control system may indicate that the traffic situation ahead is too difficult for a cruise control system to manage. This information can in turn be used to increase the time gap limits.

It is also possible that the external information regarding road condition changes is retrieved from information stored in a database, either onboard or at a service centre. The information may have been logged by the same or another vehicle travelling the same route at an earlier moment. The logged road data, comprising e.g. road slope information, can be used in combination with a forward looking sensor such as a radar or camera which tracks the vehicle ahead. By using stored information, input such as road curvature and speed limits may not be available directly, but can be estimated from the stored parameters. The stored information can be compared with the behaviour of the leading vehicle, and from this a vehicle speed behaviour model for the leading vehicle can be determined.

In this way, it is also possible to determine if a leading vehicle is using a manual speed control, i.e. the driver is in control, or if some kind of cruise control is used to maintain speed. It is also possible to determine if the leading vehicle is too heavy to maintain the speed uphill, and the levels of "under-speed" over crests or "over-speed" in descents that the cruise control uses. The vehicle speed of the host vehicle and the time gap to the leading vehicle is then adjusted accordingly.

In one example, one or a plurality of predetermined vehicle speed behaviour models are pre-stored in the control unit. The control unit uses the retrieved information to select one of the stored vehicle speed behaviour models. In this example, two vehicle speed behaviour models are used, one where the leading vehicle is using a cruise control system and one where the leading vehicle is using an adaptive cruise control system.

The distance or the time gap to the leading vehicle is measured, together with the speed of the host vehicle. Account is taken to a change in road condition. The observations of the behaviour of the leading vehicle are analysed and compared with the pre-stored vehicle speed behaviour model. The comparison will give that one model will be more likely than the other. The control system of the host cruise control may then be adapted to the selected vehicle speed behaviour model. It is of course possible to have to plurality of different vehicle speed behaviour models saved for comparison. It is also possible that a vision system using a camera can detect the brand of the leading vehicle, in order to determine which cruise control strategies to select between. Since different brands use different control strategies, a more reliable vehicle speed behaviour model for the leading vehicle can be obtained in this way. Such control strategies may include e.g. fixed speed, adaptive cruise control (ACC), e-horizon, eco-roll, speed deviation tolerances, and braking strategies in descents for heavy trucks.

When a vehicle speed behaviour model has been decided, and it is noticed that the behaviour of the leading vehicle suddenly changes, it may indicate that the cruise control system of the leading vehicle have disengaged, or is about to do so. It may e.g. be observed that the retardation of the leading vehicle first follows a smooth control strategy and then changes to a more rapid retardation, it can be assumed that the cruise control system have disengaged.

Figure 2:
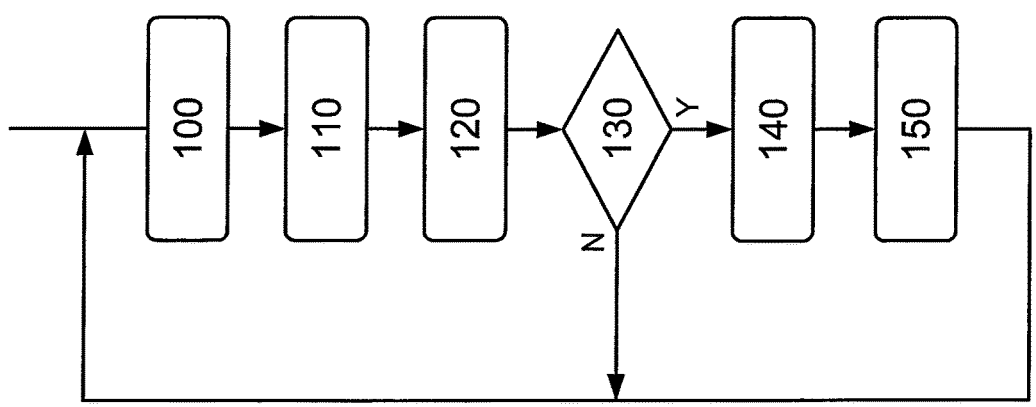
FIG. 2 shows a schematic flow chart of an inventive method for determining a vehicle speed behaviour model for a leading vehicle according to the invention.

FIG. 2 shows a schematic flow chart of a method for determining a vehicle speed behaviour model for a leading vehicle according to the invention.

In step 100, the time gap to the leading vehicle is measured. The time gap is used to set a desired distance to the leading vehicle.

In step 110, the speed of the host vehicle is measured.

In step 120, information regarding road conditions is obtained. The information may be map data, weather data or traffic data but may also be retrieved by e.g. a vision system using a camera.

In step 130, the information is analyzed to determine if the information is indicative of a change that may alter the speed of the leading vehicle. If the information is considered to be secondary, it is discarded and the method returns to step 100. If the information is considered to be of importance for the determination of a vehicle speed behaviour model, the method continuous with step 140.

In step 140, the change in vehicle speed of the leading vehicle is monitored. This monitoring is dependent on the type of road condition and may take from a few seconds up to half a minute or more.

In step 150, a vehicle speed behaviour model for the leading vehicle is determined based on the monitored changes in vehicle speed of the leading vehicle. This vehicle speed behaviour model can then be used by the host vehicle to adapt e.g. the set speed of the cruise control system or other cruise control parameters at the next upcoming change in road condition.

For some road conditions, there may not be a change of speed of the leading vehicle. If there e.g. is a slight ascent and the leading vehicle is empty, the leading vehicle may be able to keep the set speed for the entire ascent. In this case, the vehicle speed behaviour model takes account of this for similar road conditions. If the leading vehicle is fully laden at the same ascent, it may on the other hand lose a substantial amount of speed, which the vehicle speed behaviour model can take account of.

The invention is not to be regarded as being limited to the embodiments described above, a number of additional variants and modifications being possible within the scope of the subsequent patent claims.

REFERENCE SIGNS

1: Arrangement for determining a vehicle speed behaviour model
2: Host vehicle
3: Leading vehicle
4: Cab
5: Control unit
6: Distance measuring means
7: Vehicle speed measuring means
8: Camera means
9: Communication means 10: Path
11: User interface means

The invention claimed is:

1. A cruise control arrangement for a host vehicle, comprising
an arrangement for determining a vehicle speed behaviour model for a leading vehicle to predict the behavior of the leading vehicle, where the leading vehicle drives along a path in front of the trailing host vehicle, and
a cruise control system configured to adapt a vehicle speed behaviour for the host vehicle as a function of the vehicle speed behaviour model for the leading vehicle,
where the arrangement for determining a vehicle speed behaviour model comprises
a control unit in the host vehicle,
means for measuring a distance to the leading vehicle,
means for measuring a speed of the host vehicle, and
means for obtaining external information regarding an upcoming change in permanent and impermanent road conditions,
wherein the control unit is configured to
monitor a change in vehicle speed of the leading vehicle whenever there is a change in at least one of permanent and impermanent road conditions to estimate a type of road change condition for a current section of the path driven by the host vehicle,
determine if the external information is indicative of the change in vehicle speed of the leading vehicle, and
determine the vehicle speed behaviour model for the leading vehicle based on the monitored change in vehicle speed of the leading vehicle and on the upcoming change in at least one of permanent and impermanent road conditions, wherein the control unit is configured to determine the vehicle speed behaviour model by estimating an automatic cruise control scheme applied by the leading vehicle, and wherein the vehicle speed behavior model is dependent on the type of road change condition.

2. Arrangement according to claim 1, wherein the means for measuring the distance to the leading vehicle is radar.

3. Arrangement according to claim 1, wherein the cruise control system is an adaptive cruise control system.

4. Arrangement according to claim 1, wherein the cruise control system is a dynamic cruise control system.

5. Arrangement according to claim 1, wherein the arrangement for determining a vehicle speed behaviour model is connected to a forward collision warning system of the host vehicle.

6. Arrangement according to claim 1, wherein the arrangement for determining a vehicle speed behaviour model further comprises a camera adapted to monitor road signs.

7. Arrangement according to claim 1, wherein the means for obtaining external information regarding an upcoming change in at least one of permanent and impermanent a road conditions uses a map database.

8. Vehicle comprising an arrangement according to claim 1.

9. Arrangement according to claim 1, further comprising a forward looking sensor adapted to monitor a vehicle ahead of the leading vehicle.

10. A method for controlling vehicle speed behaviour, comprising:
determining a vehicle speed behaviour model for a leading vehicle, where the leading vehicle drives along a path in front of a trailing host vehicle and where the determination is done in the host vehicle, comprising:
tracking a distance to the leading vehicle,
tracking a speed of the host vehicle,
obtaining external information regarding an upcoming change in permanent and impermanent road conditions, which may alter the speed of the host vehicle,
monitoring a change in vehicle speed of the leading vehicle whenever there is a change in at least one of permanent and impermanent road conditions to estimate a type of road change condition for a current section of the path driven by the host vehicle and determining if the external information is indicative of the change in vehicle speed of the leading vehicle, and
determining the vehicle speed behaviour model for the leading vehicle based on the monitored changes in vehicle speed of the leading vehicle and on the upcoming change in at least one of permanent and impermanent road conditions, wherein determining the vehicle speed behaviour model comprises estimating an automatic cruise control scheme applied by the leading vehicle, and wherein the vehicle behavior model is dependent on the type of road change condition; and
adapting a vehicle speed behaviour for the host vehicle as a function of the vehicle speed behaviour model for the leading vehicle.

11. Method according to claim 10, where the change in vehicle speed for the leading vehicle is determined by monitoring the change in the distance to the leading vehicle.

12. Method according to claim 10, where the change in vehicle speed for the leading vehicle is determined by measuring the relative speed change with a radar.

13. Method according to claim 10, wherein the vehicle speed behaviour model is used as an input to control a cruise control system of the host vehicle.

14. Method according to claim 13, where the cruise control system is an adaptive cruise control system.

15. Method according to claim 10, where the external information comprises a road speed limit.

16. Method according to claim 10, here the external information comprises information received from a map database.

17. Method according to claim 10, where the external information is stored in a memory by a vehicle that has travelled the same path earlier.

18. A computer program product comprising a program stored on a non-transitory computer readable medium for performing all the steps of claim V when the program product is run on a computer.

* * * * *